(12) United States Patent
Patel et al.

(10) Patent No.: US 10,481,326 B2
(45) Date of Patent: *Nov. 19, 2019

(54) PHOTONIC CHIP WITH AN EVANESCENT COUPLING INTERFACE

(71) Applicant: Cisco Technology, Inc., San Jose, CA (US)

(72) Inventors: Vipulkumar Patel, Breinigsville, PA (US); Mark Webster, Bethlehem, PA (US); Ravi Tummidi, Breinigsville, PA (US); Mary Nadeau, Alburtis, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,255

(22) Filed: Feb. 19, 2018

(65) Prior Publication Data

US 2018/0188450 A1 Jul. 5, 2018

Related U.S. Application Data

(63) Continuation of application No. 15/143,944, filed on May 2, 2016, now Pat. No. 9,933,566.

(60) Provisional application No. 62/254,929, filed on Nov. 13, 2015, provisional application No. 62/298,228, filed on Feb. 22, 2016.

(51) Int. Cl.
*G02B 6/12* (2006.01)
*G02B 6/30* (2006.01)
*G02B 6/42* (2006.01)
*G02B 6/125* (2006.01)
*G02B 6/34* (2006.01)
*G02B 6/122* (2006.01)
*G02B 6/124* (2006.01)

(52) U.S. Cl.
CPC ..... *G02B 6/12004* (2013.01); *G02B 6/12002* (2013.01); *G02B 6/125* (2013.01); *G02B 6/305* (2013.01); *G02B 6/34* (2013.01); *G02B 6/4206* (2013.01); *G02B 6/4274* (2013.01); *G02B 6/4291* (2013.01); *G02B 6/124* (2013.01); *G02B 6/1228* (2013.01)

(58) Field of Classification Search
None
See application file for complete search history.

(56) References Cited

U.S. PATENT DOCUMENTS 9,933,566 B2 * 4/2018 Patel ................. G02B 6/305
2002/0172464 A1 11/2002 Delwala
(Continued)

*Primary Examiner* — Michael Stahl
(74) *Attorney, Agent, or Firm* — Patterson + Sheridan, LLP

(57) ABSTRACT

Embodiments herein describe a photonic chip which includes a coupling interface for evanescently coupling the chip to a waveguide on an external substrate. In one embodiment, the photonic chip includes a tapered waveguide that aligns with a tapered waveguide on the external substrate. The respective tapers of the two waveguides are inverted such that as the width of the waveguide in the photonic chip decreases, the width of the waveguide on the external substrate increases. In one embodiment, these two waveguides form an adiabatic structure where the optical signal transfers between the waveguides with minimal or no coupling of the optical signal to other non-intended modes. Using the two waveguides, optical signals can be transmitted between the photonic chip and the external substrate.

19 Claims, 14 Drawing Sheets

(56) References Cited

U.S. PATENT DOCUMENTS

| | | |
|---|---|---|
| 2006/0062520 A1 | 3/2006 | Yokouchi |
| 2009/0324163 A1 | 12/2009 | Dougherty et al. |
| 2012/0057816 A1* | 3/2012 | Krasulick ................ G02B 6/12 385/14 |
| 2013/0230274 A1 | 9/2013 | Fish |
| 2013/0336346 A1 | 12/2013 | Kobrinsky et al. |
| 2014/0003765 A1 | 1/2014 | Tseng et al. |
| 2014/0264400 A1* | 9/2014 | Lipson ................ H01L 27/144 257/88 |
| 2014/0294341 A1* | 10/2014 | Hatori ..................... G02B 6/12 385/14 |
| 2015/0010266 A1 | 1/2015 | Webster et al. |
| 2015/0247974 A1 | 9/2015 | Painchaud et al. |
| 2016/0266321 A1 | 9/2016 | Tummidi et al. |
| 2016/0349454 A1 | 12/2016 | Zhang et al. |
| 2016/0356960 A1 | 12/2016 | Novack et al. |
| 2017/0139142 A1 | 5/2017 | Patel et al. |

\* cited by examiner

FIG. 5E
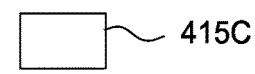
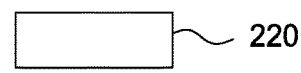
FIG. 5F
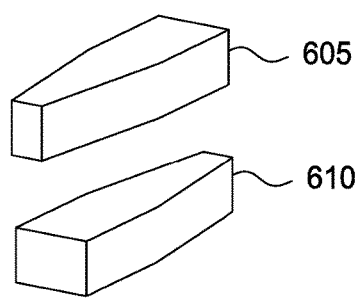
FIG. 6A          FIG. 6B

PHOTONIC CHIP WITH AN EVANESCENT COUPLING INTERFACE

CROSS-REFERENCE TO RELATED APPLICATIONS

This application is a continuation of co-pending U.S. patent application Ser. No. 15/143,944, filed May 2, 2016 which claims benefit to provisional application Ser. No. 62/254,929, filed Nov. 13, 2015 and provisional application Ser. No. 62/298,228 filed on Feb. 22, 2016. The aforementioned related patent application is herein incorporated by reference in its entirety.

TECHNICAL FIELD

Embodiments presented in this disclosure generally relate to waveguides in a silicon-on-insulator (SOI) device, and more specifically, to evanescently coupling the waveguides in the SOI device to an external optical device.

BACKGROUND

SOI optical devices may include an active surface layer that includes waveguides, optical modulators, detectors, complementary metal-oxide-semiconductor (CMOS) circuitry, metal leads for interfacing with external semiconductor chips, and the like. Transmitting optical signals from and to this active surface layer introduces many challenges. In some optical devices, lenses are used to focus the light from an external fiber optic cable or a laser source into the waveguides, thereby shrinking the mode or adjusting the numerical aperture such that the optical signal can be efficiently transferred into the sub-micron waveguides.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5F illustrate cross-sectional views of an SOI device with an optical via, according to embodiments disclosed herein.

FIGS. 6A-6B illustrate an overlapping waveguide structure for transferring an optical signal between waveguides, according to embodiments disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
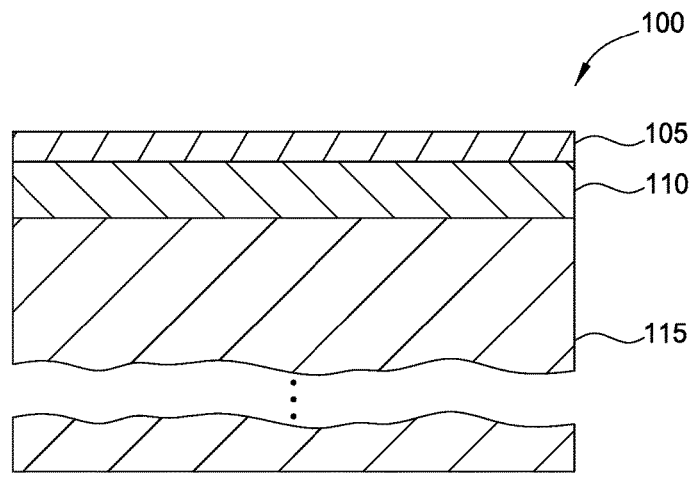
FIG. 1 illustrates an SOI device, according to one embodiment disclosed herein.

One embodiment presented in this disclosure is an optical system that includes a photonic chip. The photonic chip includes an insulation layer and an active surface layer directly contacting the insulation layer, where the active surface layer includes a first optical component optically coupled to a silicon waveguide. The photonic chip also includes an evanescent coupler spaced apart from the silicon waveguide along a direction normal to the insulation layer and active surface layer, where the evanescent coupler is optically coupled to the silicon waveguide. The optical system also includes an external optical device which includes a second optical component and a spot size converter coupled to the second optical component, where the spot size converter is configured to alter a mode size of optical signals transferred between the silicon waveguide and the second optical component. The external optical component also includes a coupling waveguide in the spot size converter, wherein a first end of the coupling waveguide overlaps a first end of the evanescent coupler along the direction normal to the insulation layer and active surface layer, where the first end of the coupling waveguide is inversely tapered relative to the first end of the evanescent coupler thereby evanescently coupling the photonic chip to the external optical device. Moreover, the photonic chip and the external optical device are bonded together along a coupling interface that is parallel to a plane where the insulation layer contacts the active surface layer.

Another embodiment presented in this disclosure is a photonic chip that includes an insulation layer and an active surface layer directly contacting the insulation layer, where the active surface layer includes a first optical component optically coupled to a silicon waveguide. The photonic chip includes an evanescent coupler spaced apart from the silicon waveguide along a direction normal to the insulation layer and active surface layer, where the evanescent coupler is optically coupled to the silicon waveguide and a coupling interface parallel to a plane where the insulation layer contacts the active surface layer, where the evanescent coupler is within at least 500 nanometers of the coupling interface to permit the evanescent coupler to optically couple to an external optical device when the external optical device is bonded to the coupling interface.

Another embodiment presented in this disclosure is a method that includes providing a photonic chip comprising a first semiconductor substrate, an insulation layer contacting the first semiconductor substrate, an active surface layer directly contacting the insulation layer, and a plurality of metal routing layers electrically coupled to a first optical component in the active surface layer, and where the first optical component is optically coupled to a silicon waveguide in the active surface layer. The method includes providing a wafer comprising an oxide layer disposed on a second semiconductor substrate and bonding a first side of the oxide layer in the wafer to a first side of the photonic chip such that the insulation layer, active surface layer, and plurality of metal routing layers are between the first and second semiconductor substrates. The method includes removing the first semiconductor substrate to expose the insulation layer and removing the first semiconductor substrate to expose the insulation layer.

Example Embodiments

Transmitting optical signals from and to the active surface layer in SOI optical devices introduces many challenges. For example, a fiber optic cable may be attached to the SOI optical device and interface with a waveguide in the SOI device's surface layer; however, the diameter of the one or more modes of the optic cable (e.g., approximately 10 microns for a single-mode cable) may have a much different size than the mode of a sub-micron dimensioned waveguide tasked with routing the optical signal in the SOI device. Accordingly, directly interfacing the fiber optic cable with the sub-micron waveguide may result in low transmission efficiency or high coupling loss.

The embodiments herein describe a photonic chip (formed from a SOI structure) which includes an optical interface for evanescently coupling the chip to a waveguide on an external substrate. Evanescent coupling refers to coupling between two waveguides which are physically separated but are in close proximity. When the evanescent tail of the optical mode of one waveguide extends into another waveguide in proximity to this waveguide, the light can couple to this second waveguide. The coupling process may be enhanced using the inverse tapers, and as such, in one embodiment, the optical interface includes a tapered waveguide that aligns with a corresponding tapered waveguide on the external substrate. The respective tapers of the two waveguides are inversely tapered such that as the width of the waveguide in the photonic chip decreases, the width of the waveguide on the external substrate increases. In one embodiment, these two waveguides form an adiabatic structure where optical signals transfer between the two waveguides with minimal or no coupling loss of the signal to other non-intended modes. In one example, the optical signals remain in the same optical mode as they propagate in the adiabatic structure. Using the two waveguides, optical signals can be transmitted between the photonic chip and the external substrate.

The optical interface in the photonic chip may be disposed at a location that is several microns away from the sub-micron waveguides in the active surface layer of the photonic chip. In one embodiment, the photonic chip includes an optical via that transfers optical signals between a waveguide near the coupling interface to a sub-micron waveguide in the active surface layer of the chip. The optical via may include a multi-layer structure that includes several waveguides disposed in different layers between the coupling interface and the active surface layer. In one embodiment, the waveguides in the optical via adiabatically transfer optical signals between each of the layers so that the optical mode of the signals does not change.

In another embodiment, the photonic chip may be bonded to another wafer (which provides support) so that the bulk silicon in the SOI structure can be removed which exposes an insulation layer in the photonic chip. A tapered waveguide can then be disposed on the insulation layer which is evanescently coupled to the sub-micron waveguide disposed on an opposite side of the insulation layer. Like above, the tapered waveguide can be evanescently coupled to a tapered waveguide in an external substrate.

FIG. 1 illustrates an SOI device 100, according to one embodiment disclosed herein. As shown, SOI device 100 includes a surface layer 105, a buried insulation layer 110 (also referred to as buried oxide (BOX) layer), and a semiconductor substrate 115. Although the embodiments herein refer to the surface layer 105 and substrate 115 as crystalline silicon, the disclosure is not limited to such. For example, other semiconductors or optically transmissive materials may be used to form the SOI device 100 shown here. Moreover, the surface 105 and the substrate 115 may be made of the same material, but in other embodiments, these layers 105, 115 may be made from different materials.

The thickness of the surface layer 105 may range from less than 100 nanometers to greater than a micron. More specifically, the surface layer 105 may be between 100-300 nanometers thick. The thickness of the insulation layer 110 may vary depending on the desired application. Generally, the thickness of insulation layer 110 may range from less than one micron to tens of microns. The thickness of the substrate 115 may vary widely depending on the specific application of the SOI device 100. For example, the substrate 115 may be the thickness of a typical semiconductor wafer (e.g., 100-700 microns) or may be thinned and mounted on another substrate in some embodiments described herein.

For optical applications, the surface layer 105 of the SOI device 100 may be etched to form one or more silicon waveguides. Because silicon has a higher refractive index compared to an insulator such as silicon dioxide or silicon oxynitride, the optical signal remains primarily in the waveguide as it propagates through the surface layer 105.

Figure 2:
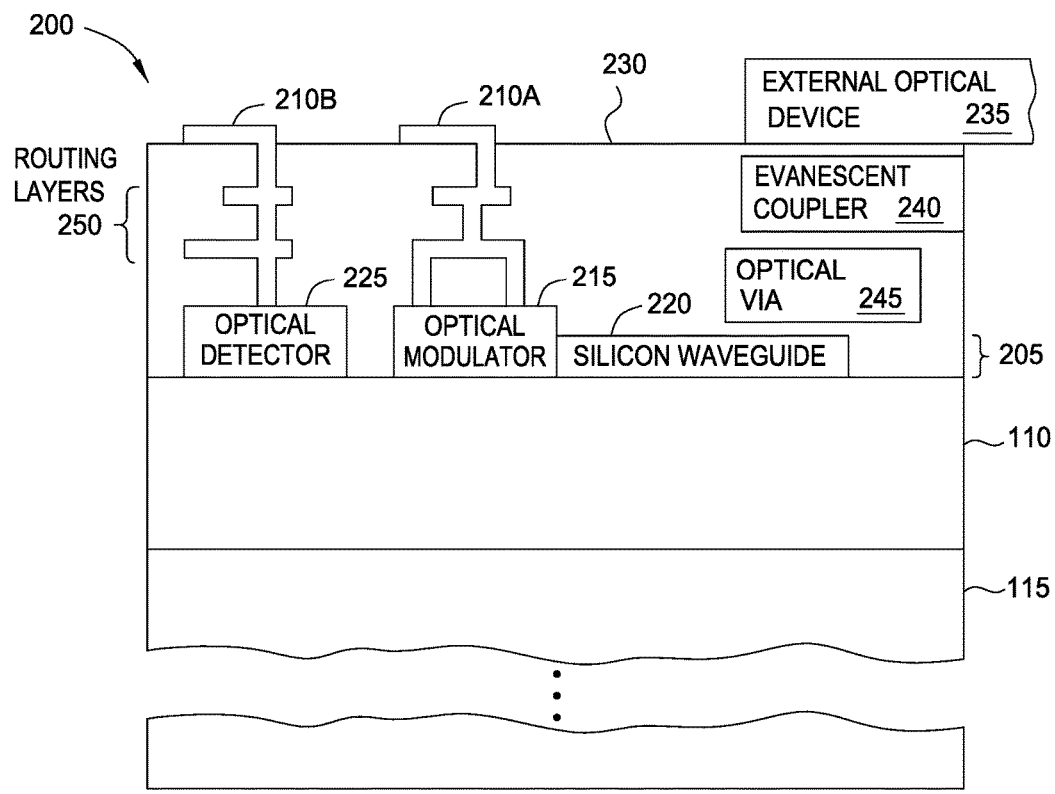
FIG. 2 illustrates an SOI device with an optical via, according to one embodiment disclosed herein.

FIG. 2 illustrates an SOI device 200 (also referred to as a photonic chip) evanescently coupled to an external optical device 235 to form an optical system, according to one embodiment disclosed herein. Like the SOI device 100 in FIG. 1, SOI device 200 includes a silicon layer 205, insulation layer 110, and substrate 115. However, the silicon layer 205 (also referred to as the active surface layer or active region) has been processed to include various optical components that may be used in an optical device 200. For example, silicon surface layer 205 includes an optical modulator 215 which is electrically coupled to a conductive lead 210A via metal routing layers 250. The conductive lead 210A is exposed on a top surface of the SOI device 200. The modulator 215 may have been formed by performing various fabrication steps on the silicon layer 205 such as etching or doping the crystalline silicon as well as depositing additional materials onto the layer 205 (e.g., amorphous silicon or polysilicon). The conductive lead 210A may be used to transmit a data signal that controls the optical modulator 215. For example, the optical modulator 215 may be a CMOS capacitor including n-type and p-type doped regions coupled to respective metal leads for changing the phase of an optical signal passing through the modulator 215. Although not shown, the metal leads 210 may be connected to an integrated circuit mounted onto the SOI device 200 that provides the data signals which control the modulator 215. In another embodiment, the integrated circuit may be physically separate from the SOI device 200 but coupled to the metal leads 210 through bond wires.

Like optical modulator 215, a silicon waveguide 220 may have been fabricated from the silicon surface layer 105 shown in FIG. 1. In one embodiment, the silicon waveguide 220 is a sub-micron waveguide where the width and height (i.e., thickness) of the waveguide are less than 1 micron. The SOI device 200 uses waveguide 220 to carry an optical signal to different areas of the silicon layer 205. For example, the optical modulator 215 may modulate a received optical signal which is then outputted and propagated along waveguide 220.

In addition to including components made from silicon, the SOI device 200 includes optical detector 225 which may be made from other materials (e.g., optical detector 225 may be a geranium detector) or a combination of silicon with other materials. These other materials may be deposited on silicon layer 205 using any suitable deposition technique.

Once the silicon layer 205 is processed to include the desired components, the components may be covered with a protective, insulative material 230 (e.g., an electrical insulative material) which may serve as a suitable base for mounting additional circuitry on the SOI device 200. In this manner, the silicon surface layer 205 of SOI device 200 may be processed using any number of techniques to form a device for performing a particular application such as optical modulation, detection, amplification, generating an optical signal, and the like.

The insulative material 230 forms an coupling interface that supports an external optical device 235 which may include a light source (e.g., a laser or optical fiber) for transmitting an optical signal into the silicon waveguide 220. Alternatively, the external optical device 235 includes a waveguide (e.g., optical fiber) for receiving light from the silicon waveguide 220. As shown, however, the surface of the insulative material 230 on which the optical device 235 is mounted is too far from the silicon waveguide 220 (e.g., several microns or more) for these two components to be optically coupled directly. Instead, the SOI device 200 includes an evanescent coupler 240 and an optical via 245 which transfer optical signals between the silicon waveguide 220 and the external optical device 235. In one embodiment, the silicon waveguide 220, optical via 245, evanescent coupler 240, and external optical device 235 transfer an optical signal adiabatically.

Figure 3:
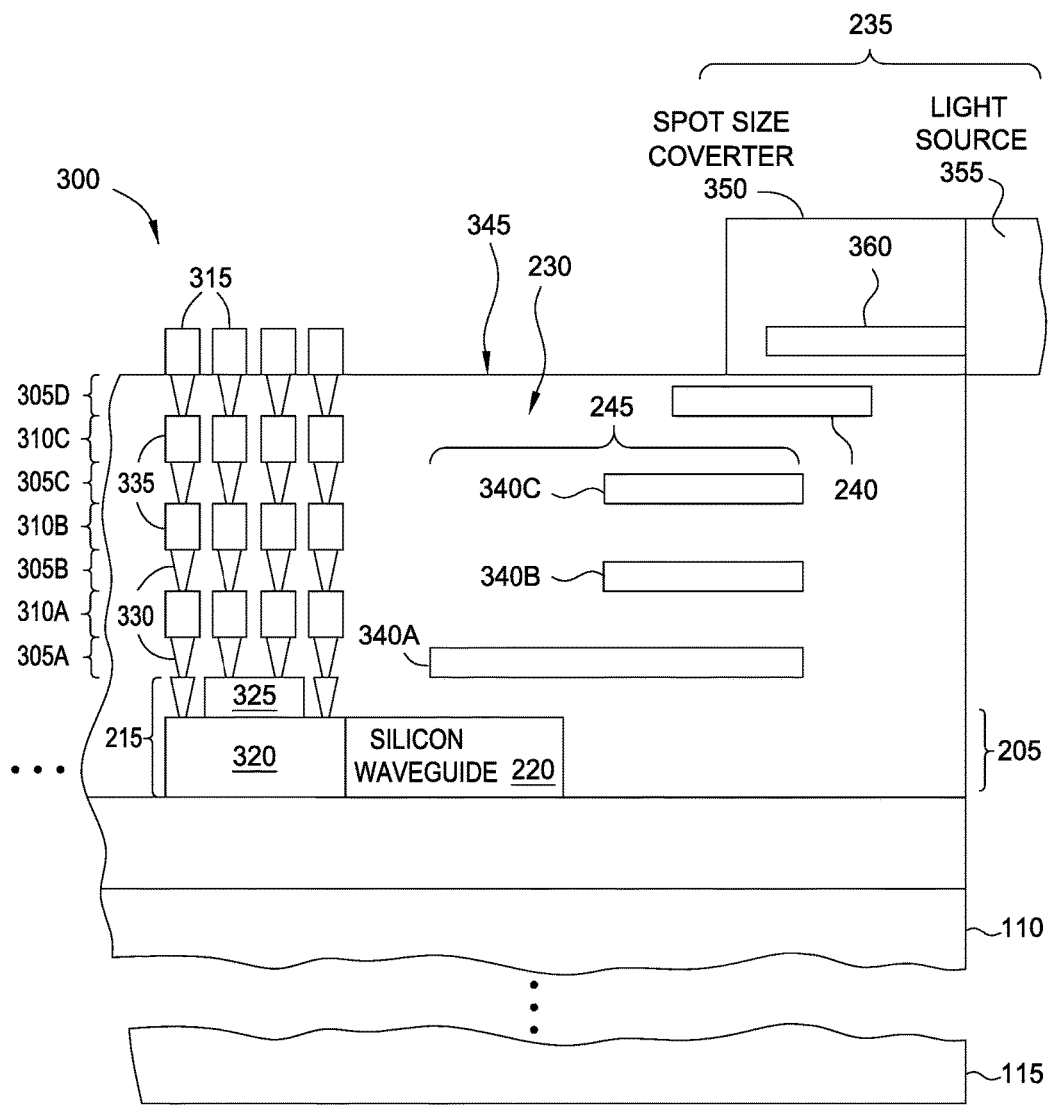
FIG. 3 illustrates a SOI device with an evanescent coupler and an optical via, according to one embodiment disclosed herein.

FIG. 3 illustrates a SOI device 300 where the evanescent coupler 240 and optical via 245 are interleaved with metal layers 310. As shown, SOI device 300 includes an optical modulator 215 coupled to a silicon waveguide 220 which may either be used to input an optical signal (e.g., a continuous wave) into the modulator 215 or to output an optical signal (e.g., a modulated signal) from the modulator 215. Furthermore, the modulator 215 includes a lower portion 320 and an upper portion 325. The lower portion 320 is located in the silicon layer 205, and as such, can include crystalline silicon that may have been doped and etched into a desired shape. The upper portion 325 may be formed from silicon selected from amorphous silicon, polysilicon, or crystalline silicon. In another embodiment, the upper portion 325 may be formed with a different semiconductor material—i.e., a material other than silicon.

To control the optical modulation performed by the lower and upper portions 320 and 325, SOI device 300 includes metal layers 310 and via layers 305 which electrically couple the portions 320, 325 to conductive pads disposed on an upper surface of the SOI device 300. For example, the SOI device 300 includes interconnected vias 330 and planar electrodes 335 which form conductive leads (e.g., conductive leads 210A and 210B shown in FIG. 2) that permit control signals to drive the lower and upper portions 320, 325 of the optical modulator 215. The vias 330 route electrical signals primarily in a vertical direction (e.g., between metal layers 310), while the planar electrodes 335 may carry the control signals in a lateral direction through the SOI device 300 (e.g., between upper and lower vias 330 coupling to the same metal layer 310). In this embodiment, device 300 includes multiple metal and via layers 305, 310 in order to electrically couple the optical modulator 215 to the conductive pads 315. As described above, the conductive pads 315 may be coupled to a control circuit (e.g., a separate IC) which provides the control signals for the modulator 215.

Silicon waveguide 220 is optically coupled to optical via 245 which includes multiple layers that each includes at least one waveguide 340. Specifically, the waveguide 340 closest to the silicon layer 205 (i.e., waveguide 340A) is optically coupled (i.e., evanescently or adiabatically coupled) to the silicon waveguide 220 such that an optical signal can be transmitted from waveguide 340A to silicon waveguide 220, or vice versa. As shown, waveguide 340A partially overlaps the silicon waveguide 220 such that a portion of the lower surface of waveguide 340A is in a facing relationship to at least a portion of the upper surface of the waveguide 220. In this example, the gap between the silicon waveguide 220 and bottommost waveguide 340A (which includes insulative material 230) is set such that the waveguide 340A is further away from the silicon layer 205 than the upper portion 325 of the optical modulator 215. That is, the waveguide 340A is disposed in a layer (i.e., via layer 305A) which is above upper portion 325. However, in other embodiments, the waveguide 340A may be located in the same layer as the upper portion 325 (but still have a gap separating waveguide 340A from silicon waveguide 220). Alternatively, the waveguide 340A may be located even further away from the silicon layer 205—e.g., within via layer 305B or 305C.

The waveguide 340A is proximate to another waveguide 340 in the optical via 245—e.g., waveguides 340B and 340C—such that the waveguides 340 form an optical adiabatic structure for transmitting optical signals. In one embodiment, the waveguides 340 are arranged such that the waveguides 340 collectively form an adiabatic waveguide which permits single modal (TE and/or TM) propagation. When an optical signal is being transferred from silicon waveguide 220 to optical via 245, the optical signal is first received by waveguide 340A but then spreads out across the other waveguides 340A-C as the signal propagates towards the right side of the SOI device 300. However, as the optical signals approach the termination point of the optical via 245 (i.e., the right most surfaces of the waveguides 340), the waveguides 340 are formed such that the optical signals transfer into the uppermost waveguide 340C. Put differently, as optical signals move from the left to the right, the optical via 245 transfers optical signals received at the lowermost waveguide 340A to the uppermost waveguide 340C. The reverse is also true for signals moving from right to left in the optical via 245 where signals are transferred from the uppermost waveguide 340C to the lowermost waveguide 340A and eventually into the silicon waveguide 220.

Although FIG. 3 illustrates interleaving metal layers 310 with via layers 305, in another embodiment, multiple via layers 305 may be placed between metal layers 310. That is, the vias 330 in one via layer 305 may connect to the vias 330 in another via layer 305 rather than to a planar electrode 335. Moreover, FIG. 3 illustrates placing each of the waveguides 340 in the same layers 305 as the vias 330 (also referred to as intermetal layers). However, the waveguides 340 do not need to be located on every other via layer 305. For example, waveguide 340B may be located on via layer 305C instead of layer 305B such that there are two metal layers 310 between waveguides 340A and 340B. When forming the via layers 305, the waveguides 340 are disposed in the same layers using either different processing steps or the same processing steps used to form the vias 330. Moreover, although the waveguides 340 are shown here as being interspersed between the metal layers 310, in another embodiment the waveguides 340 may be on the same layer as the metal layers 310, or a combination of the metal layers 310 and via layers 305. Nonetheless, in one embodiment, the optical via 245 does not include any conductive material (neither vias 330 nor planar electrodes 335) directly between any of the waveguides 340.

In one embodiment, all the waveguides 340 in the optical via 245 are made from the same material (e.g., silicon nitride, silicon oxynitride, polysilicon, or amorphous silicon) which is different than the insulative material 230 (e.g., silicon dioxide or silicon oxynitride). Alternatively, the waveguides 340 may be made from different materials. In one embodiment, unlike the silicon waveguide 220, the waveguides 340 are not made from crystalline silicon.

Although FIG. 3 illustrates using the optical via 245 to transmit an optical signal to, or receive an optical signal from, the external optical device 235 disposed on an coupling interface 345, the present disclosure is not limited to such. For example, the optical via 245 may be used to transfer an optical signal to or from a PN junction, Ge modulators, hybrid integrated III-V lasers, detectors, and the like.

As shown, the external optical device 235 includes spot size converter 350 and an optical component 355. In one embodiment, the optical component 355 is a light source such as a laser or optical fiber that transmits an optical signal to the spot size converter 350. The spot size converter 350 includes at least one coupling waveguide 360 that reduces the diameter of the mode of the optical signal provided by the light source. For example, the diameter of the one or more modes of the optical fiber (e.g., approximately 10 microns for a single-mode fiber) may have a much different size than the mode of a sub-micron dimensioned waveguide 220 tasked with routing the optical signal in the SOI device 300. The spot size converter 350 couples the optical component 355—e.g., a fiber optic cable, semiconductor waveguide, or a laser—to the evanescent coupler 240 in the SOI device 300. For example, the waveguide 360 (or waveguides) in the sport size converter 350 may increase or decrease the mode size of the optical signal to improve the efficiency of the optical coupling between the SOI device 300 and the external optical device 235.

In another embodiment, the spot size converter 350 is used to transmit optical signals from the SOI device 300 to the external device 235. In this case, instead of a light source, the optical component 355 includes an optical transmission medium such as a fiber optic cable. Because the mode size of the optical signal in the evanescent coupler 240 (i.e., a waveguide) may be much smaller than the mode size corresponding to the fiber optic cable, when the optical signal is evanescently coupled into the waveguide 360, the spot size converter 350 increases the diameter of the mode to better match the properties of the fiber optic cable. In this manner, the optical via 245 and evanescent coupler 240 can be used to transmit optical signals to, and receive optical signals from, the external device 235 mounted on the coupling interface 345.

Figure 4:
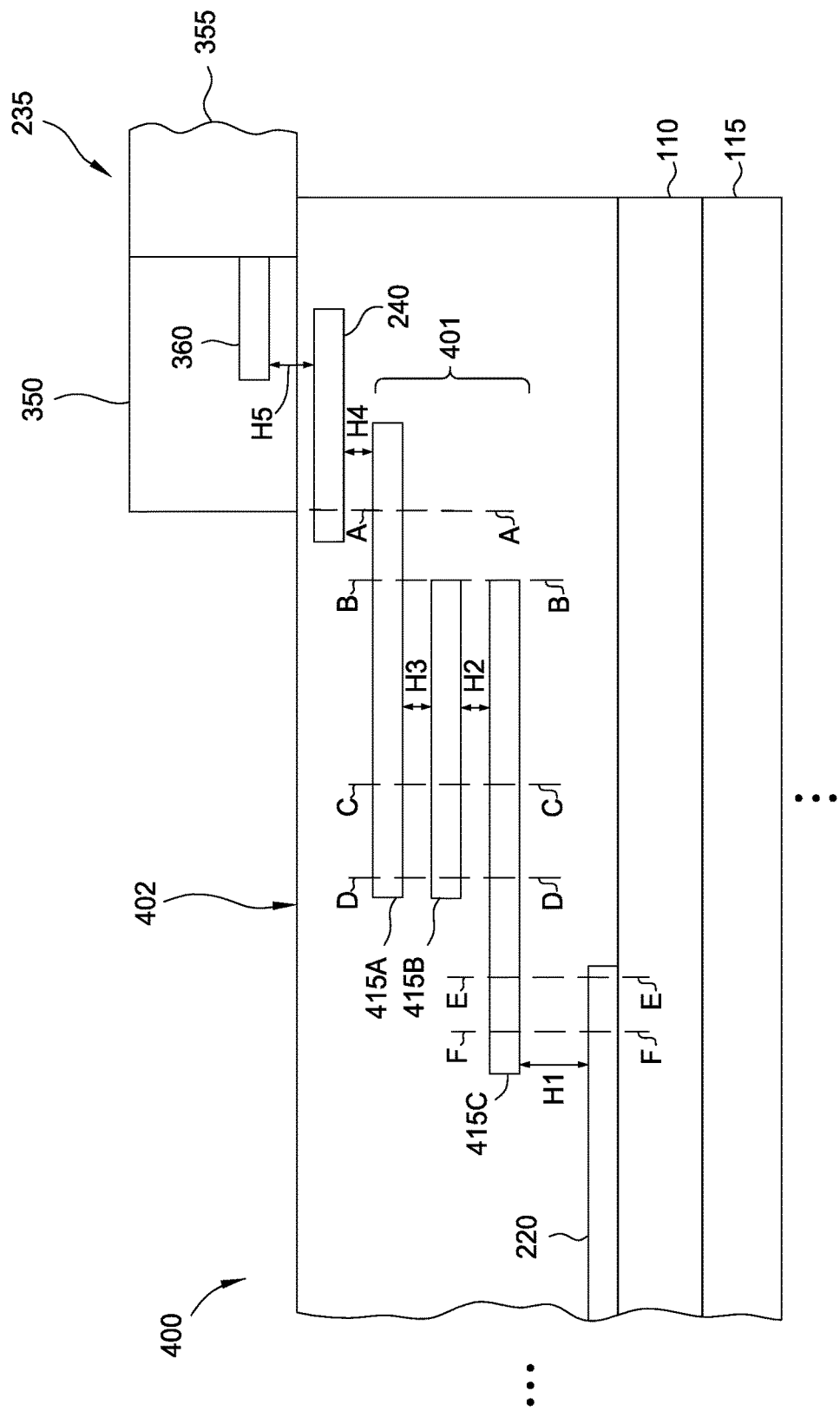
FIG. 4 illustrates a side view of a SOI device with an optical via, according to one embodiment disclosed herein.

FIG. 4 illustrates a side view of a SOI device 400 with an optical via 401, according to one embodiment disclosed herein. Moreover, the SOI device 400 includes an evanescent coupler 240 for transmitting optical signals between the external optical device 235. Although not shown, the silicon waveguide 220 may traverse the silicon layer 205 to couple an optical signal to various optical components in the silicon layer 205.

In this example, the optical via 401 is located above the silicon layer 205, insulation layer 110, and semiconductor substrate 115. Moreover, the optical via 401 is disposed below a coupling interface 402 on which the external optical device 235 is mounted. As shown, the coupling interface 402 is an external facing surface of the SOI device 400.

The optical via 401 includes separate waveguides 415 (or prongs) embedded in an insulation material that is different than the material of the waveguides 415. For example, the waveguides 415 may be silicon nitride, while the insulation material is silicon oxynitride or silicon dioxide. Generally, the waveguides 415 may be made of any material with a higher refractive index than the material of the insulation material surrounding the waveguides 415.

Referring back to FIG. 3, the waveguides 415 may be located in intermetal via layers that are between metal layers in the SOI device. As such, the optical via 401 may be formed in the SOI device 400 in parallel with forming electrical connections to optical components in the silicon layer 205. However, in other embodiments, the waveguides 415 may be formed on the same level as the metal layers or be used in a SOI device that does not include electrical connections extending away from the silicon layer 205 in a direction normal to the silicon layer 205.

The gap (H1) between the silicon waveguide 220 and the waveguide 415C ranges between a few nanometers to 1 micron, or more specifically, from 10 nm to 500 nm. Moreover, waveguide 415C partially overlaps the silicon waveguide 220 such that the two waveguides are adiabatically and evanescently coupled. Waveguide 415C is also separated from waveguide 415B by a gap (H2) that ranges from hundreds of nanometers to 5 microns, or more specifically, from 200 nm to 2.5 microns. The gap (H3) between waveguide 415B and waveguide 415A may have a similar range as the gap (H2) between waveguide 415B and 415C. In one example, the gaps H2 and H3 may be the same, while in other examples, the gaps may be different. For example, if the waveguides 415A-C are separated by exactly one metal layer, then the gaps may be the same. However, if waveguides 415A and 4156 are separated by two metal layers while waveguides 415B and 415C are separated by only one metal layer, than gap H3 may be larger than gap H2. The gap H4 illustrates the distance between the uppermost waveguide 415A in the optical via 401 and the evanescent coupler 240, while gap H5 illustrates the distance between the evanescent coupler 240 and the waveguide 360 in the spot size converter 350 in the external device 235. In one embodiment, the gaps H4 and H5 are less than 1 micron, and in one embodiment, the gaps H4 and H5 are equal to or less than 500 nanometers. As described in detail below, the gaps H4 and H5 are set so that the coupler 240 is evanescently coupled to both the upper waveguide 415A in the optical via 401 and the waveguide 360 in the external device 235.

Figure 5A:
Figure 5A:
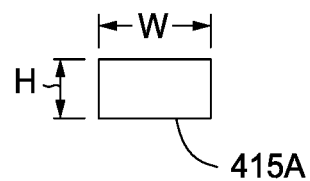

FIGS. 5A-5F illustrate cross-sectional views of the optical via 401 in FIG. 4, according to embodiments disclosed herein. Specifically, FIG. 5A illustrates the cross section A-A of a portion of the optical via 401 in FIG. 4A that is closest to the evanescent coupler 240. The cross section A-A passes through both waveguide 415A in the optical via 401 and the evanescent coupler 240. As shown, the width (W) of the waveguide 415A is smaller than the width of the evanescent coupler 240. As described later, the widths of the waveguide 415A and coupler 240 may inversely taper such that as the width of the waveguide 415A increases along a direction of propagation of an optical signal, the width of the coupler 240 decreases, and vice versa. This inverse taper causes optical signals traveling from left to right along the optical via to transfer evanescently from waveguide 415A to the coupler 240, and optical signals traveling from right to left to transfer from the coupler 240 to the waveguide 415A.

Figure 5B:
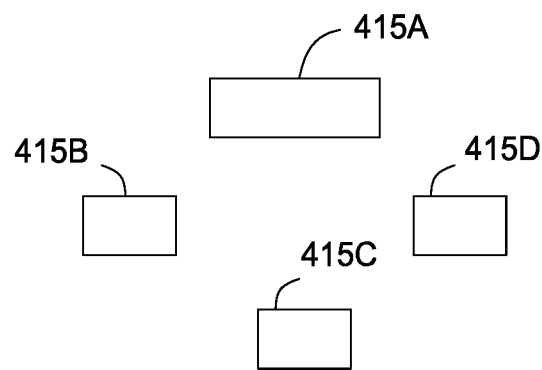

FIG. 5B illustrates the cross section B-B that passes through all four waveguides 415 in the optical via 401. At this location, the width of waveguide 415A is greater than the width of the other waveguides 415B-D. In on embodiment, the cross section B-B illustrates termination surfaces of the waveguides 415B-D while the waveguide 415A continues to extend towards the right side of the SOI device toward the coupler 240 (not shown). Moreover, the width of the waveguide 415A is greater at cross section B-B than at cross section A-A.

As optical signals travel from left to right in the optical via 401, the widths of the waveguides 415B-D taper to the widths shown in FIG. 5B while the width of the waveguide 415A increases. As such, at the location illustrated by FIG. 5B, most of the power of the optical signal is centered around the waveguide 415A. Stated differently, tapering the widths of the waveguides B-D cause the optical signal to transfer primarily into the waveguide 415A. In one embodiment, the tapering of widths of the waveguides 415B-D is done in an adiabatic fashion.

Figure 5C:
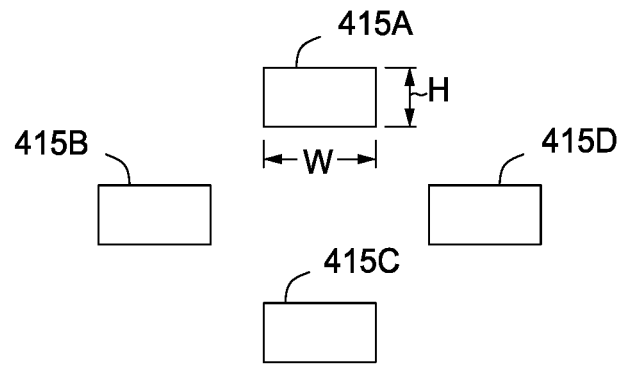

FIG. 5C illustrates the cross section C-C near the middle of the optical via 401. Here, the four separate waveguides 415A-D have the same or similar width and height (i.e., thickness) dimensions. These dimensions, as well as the spacing between the waveguides 415A-D may vary depending on the specific application. In one embodiment, the width of the waveguides 415A-D may range from approximately 150-300 nanometers with a height between 150-250 nanometers. More specifically, the width may be around 150 nanometers while the height is approximately 200 nanometers. The distance between waveguide 415A and waveguide 415C and the distance between waveguide 415D and waveguide 415B may be around two microns.

Figure 5D:
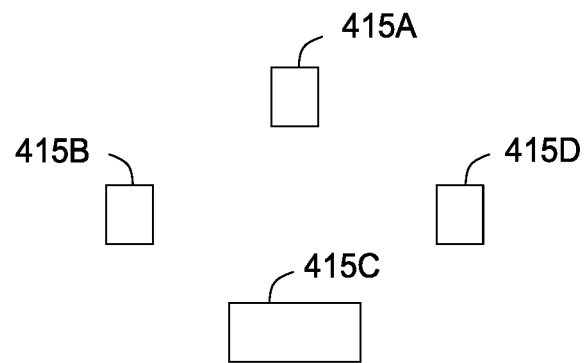

FIG. 5D illustrates the cross section D-D of the optical via 401. This figure illustrates that as the optical via 401 extends away from the evanescent coupler 240, the widths of the waveguides 415A, 415B, and 415D decrease while the width of waveguide 415C, which is closest to the silicon layer 205, increases. In one embodiment, the tapering of widths of the waveguides 415A, 415B, and 415D is done in an adiabatic fashion. This tapering results in a gradual transition of optical energy from an optical mode which is confined by all the waveguides 415A-D near cross section C-C, to a mode which is gradually confined more and more in the waveguide 415C at positions farther away from the evanescent coupler 240. This tapering transfers the optical energy confined by waveguides 415A-D near cross section C-C to waveguide 415C alone at locations farther away from coupler 240. However, the opposite is also true. That is, tapering the widths also enables a signal introduced in the lower waveguide 415C to be transferred to a mode confined by waveguides 415A-D as the optical signal propagates towards the evanescent coupler 240. The widths of the waveguides 415A-D may change continuously (e.g., a linear or non-linear fashion such as exponentially or at higher order polynomial profiles) or at discrete increments as the optical via 401 extends away from the coupler 240. As shown in FIG. 4, eventually the waveguides 415A, 415B, and 415D terminate when moving from right to left in the optical via 401, while waveguide 415C continues to transmit the optical signal.

In one embodiment, the optical via 401 has a length of at least 300 microns between the cross sections B-B and D-D.

FIG. 5E illustrates the cross section E-E where the optical via 401 overlaps the silicon waveguide 220. As shown, the width of waveguide 415C is greater than the width of the silicon waveguide 220 in the silicon layer 205. As above, the distance between waveguide 415C and the waveguide 220 may range from hundreds of nanometers to only a few nanometers depending on the techniques used to fabricate the SOI device. In some fabrication techniques, a portion of waveguide 415C may directly contact waveguide 220.

FIG. 5F illustrates the cross section F-F where the optical via 401 overlaps the silicon waveguide 220. Here, the width of waveguide 415C has shrunk while the width of the waveguide 220 has increased. This tapering, which is again done in an adiabatic fashion, results in the optical signal in waveguide 415C transferring to waveguide 220, and vice versa, with minimal loss. Eventually, waveguide 415C terminates and waveguide 220 propagates the optical signal to one or more optical components located in the silicon layer 205.

Although the embodiments above discuss tapering the waveguides 415A-D by changing the width, a similar transfer of optical power may occur if the heights are tapered, or some combination of both. However, tapering the height of the waveguides 415A-D may require different lithography and fabrication techniques or different materials.

FIGS. 6A-6B illustrate an overlapping waveguide structure for transferring an optical signal between waveguides, according to embodiments disclosed herein. As shown, FIG. 6A illustrates a plan view of a first tapered waveguide 605 partially overlapping a second tapered waveguide 610. Specifically, FIG. 6A may be the arrangement of the portion of the SOI device in FIG. 4 where the waveguide 415C overlaps waveguide 220, where the optical coupler 240 overlaps the waveguide 415A, and where the waveguide 360 in the external optical device 235 overlaps the optical coupler 240. The tapering of the waveguides is done in a manner to form an adiabatic structure to minimize optical loss. Although FIGS. 6A and 6B illustrate that the widths of the tapers vary linearly, the waveguides can also taper in a non-linear fashion, for example, exponentially or some higher order polynomial profile as long as the adiabatic criterion is satisfied. In one embodiment, the distance between the first and second waveguides 605 and 610 is less than a micron. For example, the waveguides 605, 610 may be separated by 500 nanometers or less. The separation distance may affect the efficiency at which an optical signal transfers between the waveguides 605 and 610 as well as the length of the device, and thus, an SOI structure may be designed such that the waveguides 605 and 610 are as close as fabrication techniques allow.

FIG. 6B illustrate a top view of waveguides 605 and 610. By at least partially overlapping the waveguides 605, 610, an optical signal may be transferred from a waveguide above the surface layer (e.g., the first tapered waveguide 605) to a waveguide in the active surface layer (e.g., the second tapered waveguide 610) of the SOI device. In one embodiment, the waveguides 605, 610 only partially overlap where their respective ends begin to taper. The slope or shape of the taper may depend on the material used for forming the waveguides 605, 610 as well as the height of waveguides 605, 610. In one embodiment, at the widest point, the waveguides 605, 610 may have a width that ranges from 300 nanometers to 2 microns. At the narrowest point, the waveguides 605, 610 may have a width from 100 nanometers to 200 nanometers. The length of the tapering portion may be in the range from 10 microns to 50 microns—e.g., around 20 microns.

Figure 7:
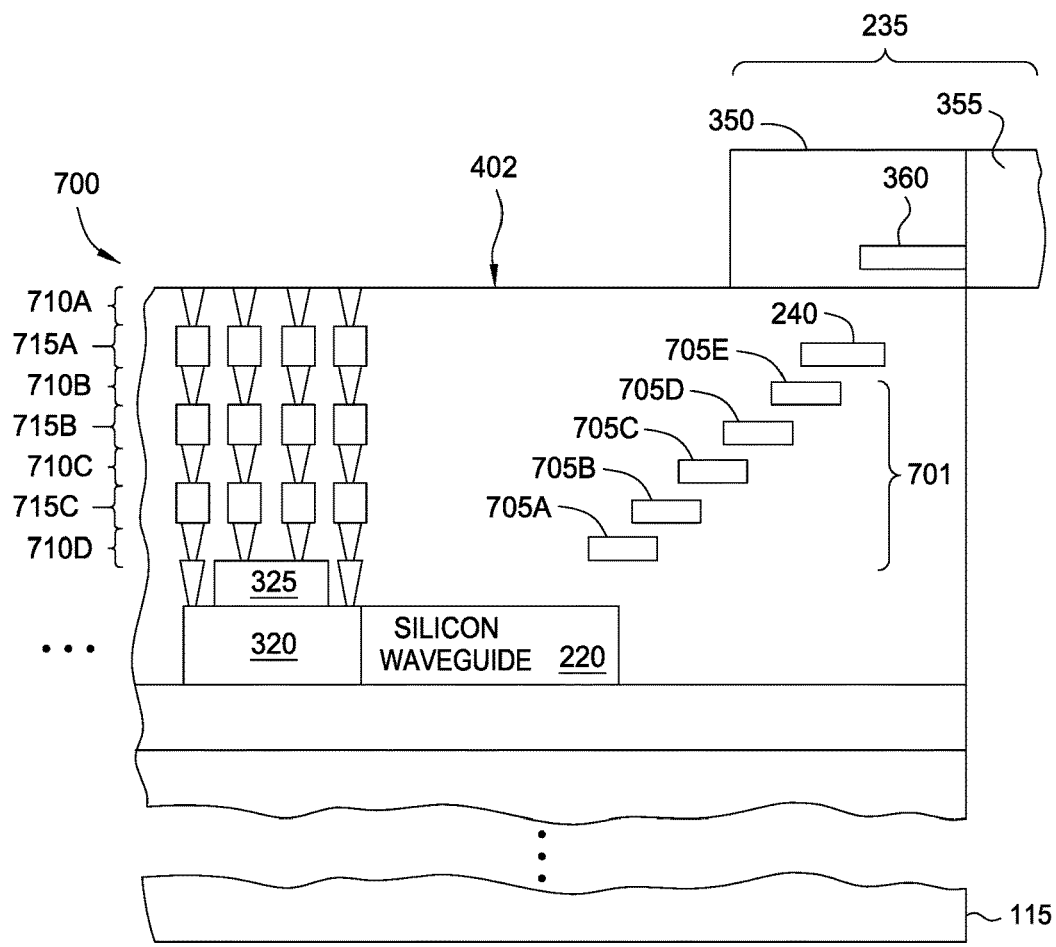
FIG. 7 illustrates a side view of a SOI device with multiple evanescent couplers, according to one embodiment disclosed herein.

FIG. 7 illustrates a side view of a SOI device 700 with multiple evanescent couplers 705, according to one embodiment disclosed herein. As shown, an optical via 701 includes a plurality of evanescent couplers 705 which transfer signals between the silicon waveguide 220 and the external optical device 235. One difference between the optical via 701 in FIG. 7 and the optical via 401 in FIG. 4 is that the distance between each of the evanescent couplers 705 may be less than one micron. In contrast, the arrangement of the waveguides 415 in FIG. 4 may permit the different layers in the optical via 401 to be spread further apart (e.g., more than two microns) than optical via 701.

The tips of each of the evanescent couplers 705 may be inversely tapered as shown in FIGS. 6A and 6B relative to the neighboring couplers 705. For example, the rightmost tip of coupler 705A is inversely tapered relative to the leftmost tip of coupler 705B. Similarly, the rightmost tip of coupler 705B is inversely tapered with the leftmost tip of coupler 705C. In addition, the leftmost tip of waveguide 705A is inversely tapered to the rightmost tip of the silicon waveguide 220 in their overlapping region, while the rightmost tip of waveguide 705E is inversely tapered with the leftmost tip of optical coupler 240. As such, the widest portion of the couplers 705 may be their center since both the left and right ends taper. Because each layer is evanescently coupled to the layer above and the layer below, the optical via 701 can transfer optical signals vertically between the silicon waveguide 220 and the optical coupler 240 (and the external optical device 235).

In one embodiment, to achieve a space of less than one micron between each evanescent coupler 705, the couplers 705 may be disposed in both the via layers 710 and metal routing layers 715. As such, the optical via 701 may require more vertical layers of waveguides than the optical via 401 in FIG. 4.

As shown in FIGS. 2, 3, 4, and 7, the external device 235 is mounted on the coupling interface (e.g., interface 402) that is parallel to the silicon layer 205 and insulation layer 110. In one embodiment, the bottom surface of the external optical device 235 directly contacts the coupling interface 402 of the SOI device where the waveguide 360 overlaps the optical coupler 240. Put differently, there is no adhesive material (e.g., epoxy or solder) disposed between the external device 235 and the coupling interface 402 at this location so that the interface creates a nearly zero bond-line thickness joint. In one embodiment, the external optical device 235 is mounted to the coupling interface 402 using an oxide-oxide bond. For example, the insulative material used to form the coupling interface 402 (e.g., silicon dioxide) may form the oxide-oxide bond with the oxide material at the bottom surface of the spot size converter 350. In one embodiment, the SOI device 700 and external device 235 are arranged such that the waveguide 360 overlaps the evanescent coupler 240 and then annealed at low temperatures (e.g., 100-200 degrees Celsius) to form the oxide-oxide bond between the substrates.

In another embodiment, the external optical device 235 is coupled to the SOI device 700 using a solder collapse or epoxy collapse technique. To do so, solder or epoxy is disposed in a recess in the external device 235 or in the coupling interface 402 at a location away from where the waveguide 360 and the optical coupler 240 overlap. The solder or epoxy pulls the two substrates together to form the nearly zero bond line joint where the evanescent coupler 240 and the waveguide 360 overlap.

Because evanescent coupling is used to transfer optical signals between the external device 235 and the SOI device 700, the alignment tolerances are more flexible compared to other coupling techniques such as placing the external device to the right of the SOI device 700 and using lenses. Thus, instead of active alignment, passive alignment can be used to align the waveguide 360 to the optical coupler 240.

Figure 8:
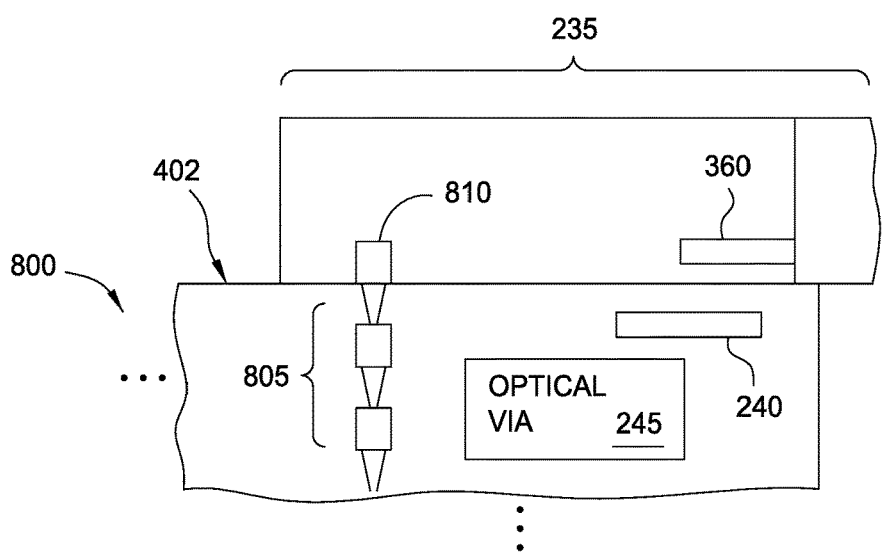
FIG. 8 illustrates coupling an external optical device to the SOI device, according to one embodiment disclosed herein.

FIG. 8 illustrates coupling the external optical device 235 to the SOI device 800, according to one embodiment disclosed herein. For clarity, many of the components in the SOI device 800 have been removed. In this embodiment, the external optical device 235 extends over the via and metal layers 805. Specifically, the external device 235 includes a bond pad 810 that couples to the vias and metal layers 805 in the SOI device 800. In one embodiment, the SOI device 800 provides power to the external device 235 via the bond pad 810. For example, the SOI device 800 may provide DC power to the bond pad 810 which is then routed to the optical component 355 using a routing layer (not shown) for, e.g., powering a laser.

To couple the external optical device 235 to the SOI device 800, a metal-oxide bond may be used to generate a nearly zero bond-line joint where the bond pad 810 overlaps the via and metal layers 805 and the waveguide 360 overlaps the evanescent coupler 240. For example, the bond pad 810 may be copper which fuses with the copper in the topmost metal layer 805. Moreover, the oxide material of the external device 235 and the SOI device along the coupling interface 402 also bond in order to form an oxide-oxide bond. Thus, the external device 235 is coupled to the SOI device 800 using a copper-oxide hybrid bond.

Figure 9A:
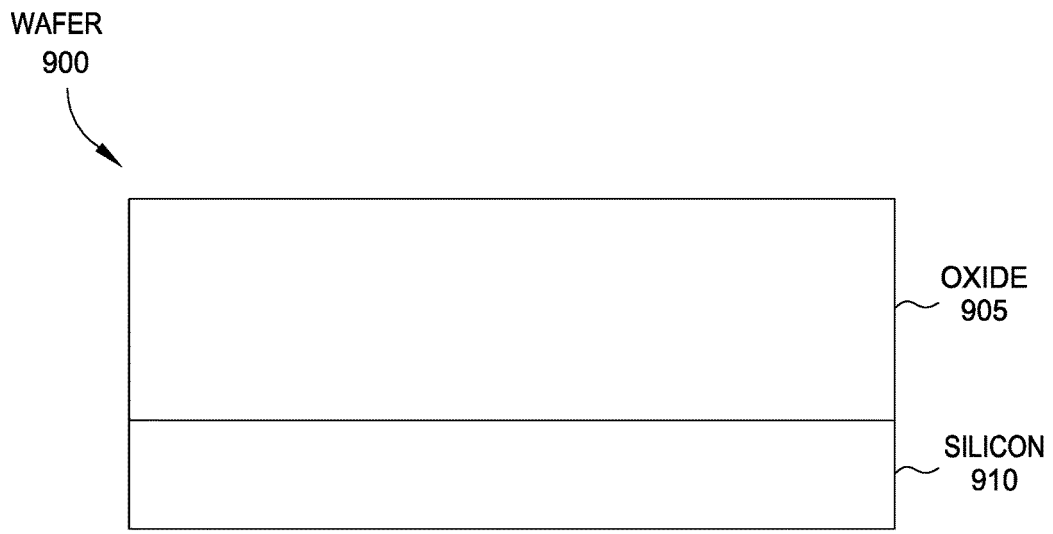
FIGS. 9A-9F illustrate evanescently coupling a photonic chip to an external optical device, according to embodiments described herein.

FIGS. 9A-9F illustrate evanescently coupling a photonic chip to an external optical device, according to embodiments described herein. FIG. 9A illustrates a wafer 900 that includes an oxide layer 905 disposed on a semiconductor material. Although the semiconductor material is shown as crystalline silicon substrate 910 in this embodiment, any semiconductor material that has an oxide layer can be used. In this method, the wafer 900 is used primarily to support a photonic chip (e.g., a SOI device), and thus, does not need to be any specific semiconductor wafer.

Figure 9B:
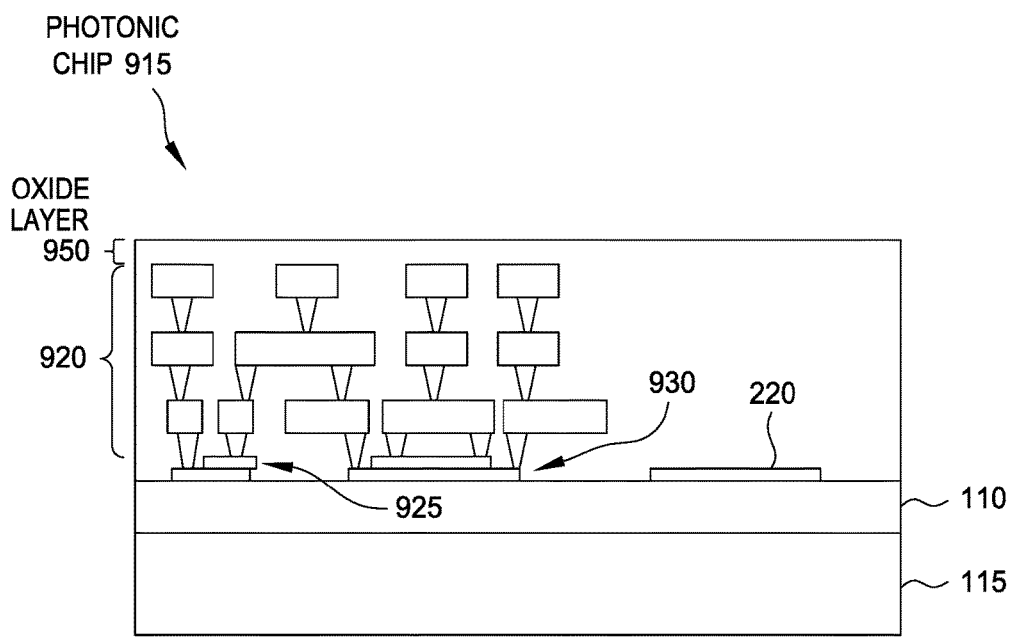

FIG. 9B illustrates a photonic chip 915 (which can also be referred to as a SOI device) which includes metal and via routing layers 920 which provide vertical (e.g., up and down routing) and horizontal routing (i.e., routing into and out of the page). As shown, the top bond pads in the layers 920 are covered by a thin (e.g., less than five micron) oxide layer 950.

The metal and via routing layers 920 transmit electrical signals between optical components in an active surface layer in the photonic chip 915—e.g., optical components 925 and 930. These optical components can be detectors, modulators, phase shifters, and the like. The photonic chip 915 includes silicon waveguide 220 for transmitting optical signals to or from the optical components to an external optical device.

Figure 9C:
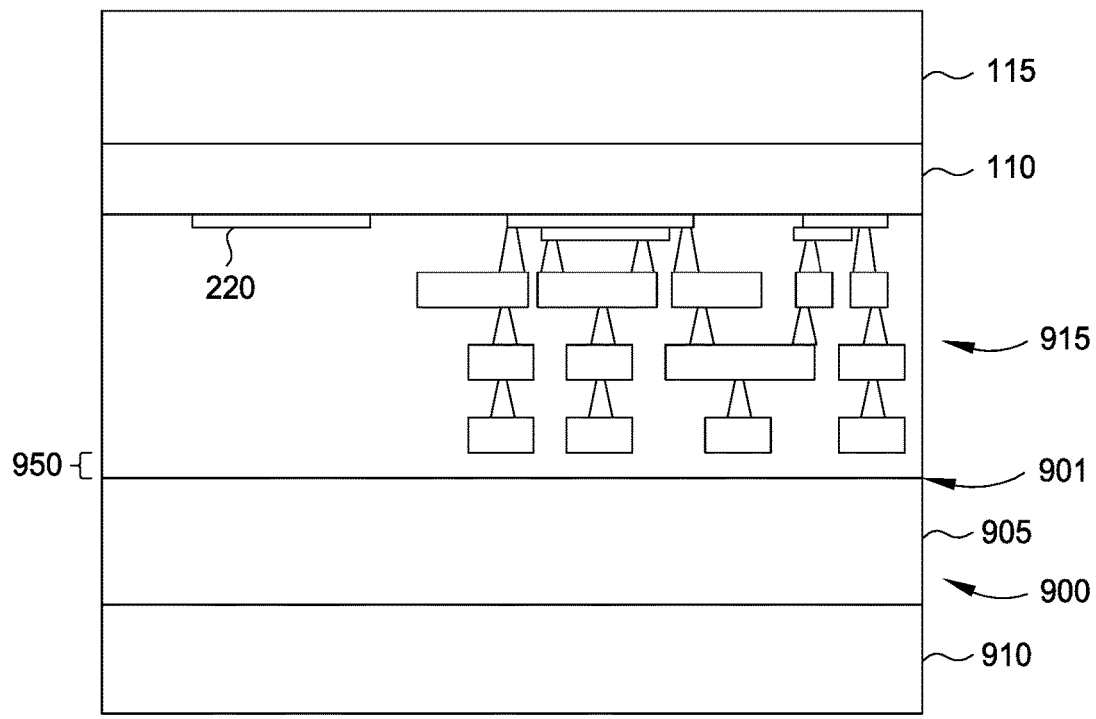

FIG. 9C illustrates bonding the photonic chip 915 to the wafer 900. As shown, the photonic chip 915 is flipped over so that the oxide layer 950 contacts the oxide layer 905 in the wafer 900. In one embodiment, an oxide-oxide bond is formed between the two substrates to generate a single substrate (referred to collectively as photonic chip 915). For example, the photonic chip 915 may be annealed at relative low temperatures (less than 200 degrees Celsius) to form the bond.

Figure 9D:
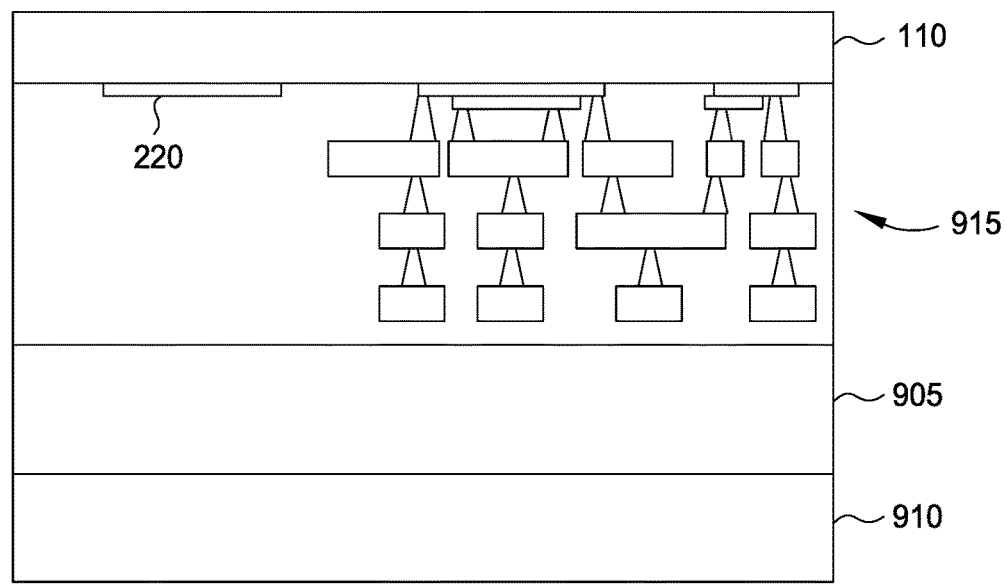

FIG. 9D illustrates removing the semiconductor substrate 115 from the photonic chip 915. For example, the material of substrate 115 can be removed using a grinding or chemical mechanical polishing (CMP) technique. During this process, the oxide layer 905 and silicon material 910 provide extra mechanical support to the chip 915.

In one embodiment, the insulation layer 110 is also thinned. For example, in some SOI structures, the insulation layer 110 may be a micron or more. However, thinning this layer 110 to less than half a micron may improve evanescent coupling to the silicon waveguide 220.

Figure 9E:
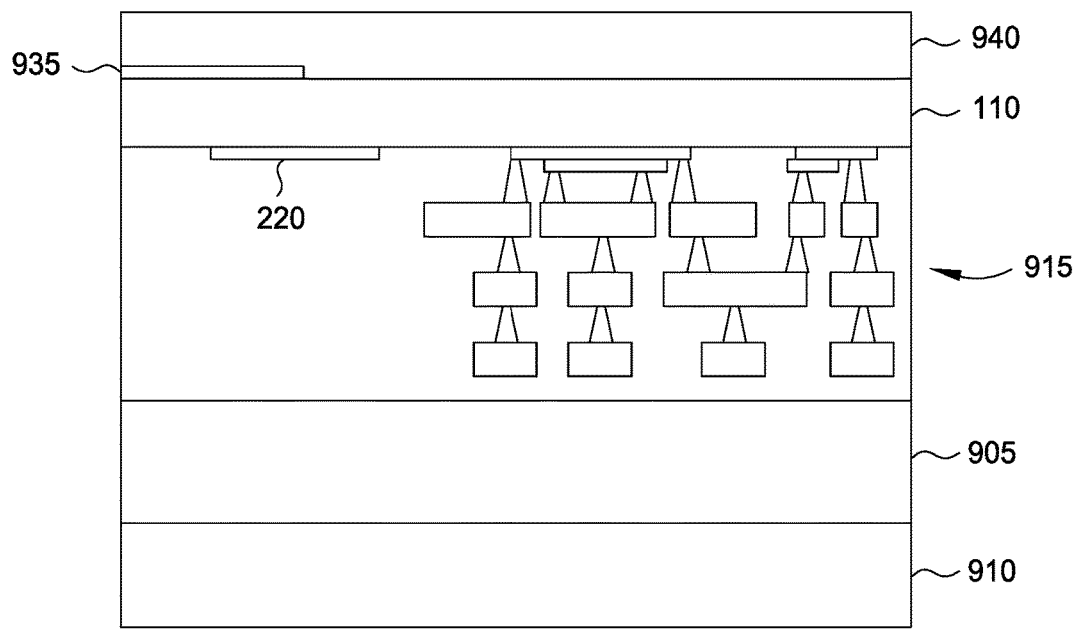

FIG. 9E illustrates disposing an evanescent coupler 935 on the insulation layer 110. The coupler 935 is embedded in an oxide layer 940 which may be an insulator such as silicon dioxide. In one embodiment, waveguides 935 and 220 are tapered such that the two waveguides are evanescently coupled using the structure shown in FIGS. 6A and 6B. In one embodiment, the total vertical separation distance between the evanescent coupler 935 and the silicon waveguide 220 is less than half a micron.

Figure 9F:
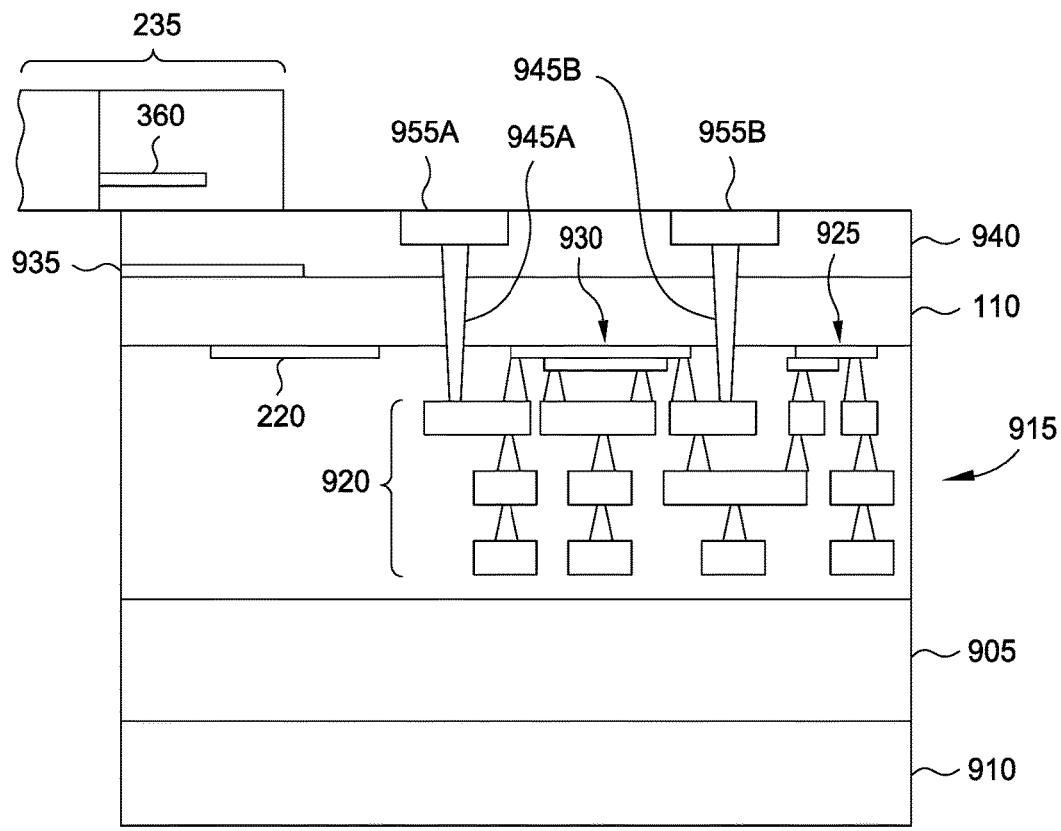

FIG. 9F illustrates disposing the external optical device 235 onto the photonic chip 915. As shown, the external device 235 is disposed such that the waveguide 360 overlaps the evanescent coupler 935. In one embodiment, the portions of waveguides 935 and 360 form the inverse taper evanescent coupler in FIG. 6A and 6B. In this manner, the coupler 935 can be evanescently coupled to both the silicon waveguide 220 and the waveguide 360 so that the photonic chip 915 can transfer signals to, and receive signals from, the external device 235. Moreover, the external device 235 can be bonded to the photonic chip 915 using, e.g., an oxide-oxide bond or a solder/epoxy collapse techniques.

FIG. 9F also illustrates creating through oxide vias (TOV) 945 between bond pads 955 in the topmost surface of the photonic chip 915 to the routing layers 920. Although FIG. 9F illustrates the TOV 955A disposed between the silicon waveguide 220 and the optical component 930, the TOV 955A may be placed elsewhere (e.g., moved either into the page or out of the page) so that optical signals can be transferred between the waveguide 220 and the component 930.

In one embodiment, the bond pads 955 are coupled to an integrated circuit (IC) which drives electrical signals into the photonic chip to control the components 925 and 930 or receives electrical signals from these components. For example, if component 925 is an optical modulator, the IC can drive electrical signals onto the bond pads 955 which are carried by the TOVs 945 to the routing layers 920 and eventually to the component 925. Thus, instead of attaching the IC to bond pads in the routing layers 920 furthest from the insulation layer 110, in this embodiment, the IC is attached, using the TOVs 945, to the layer in the routing layers 920 closest to the insulation layer 110.

Figure 10A:
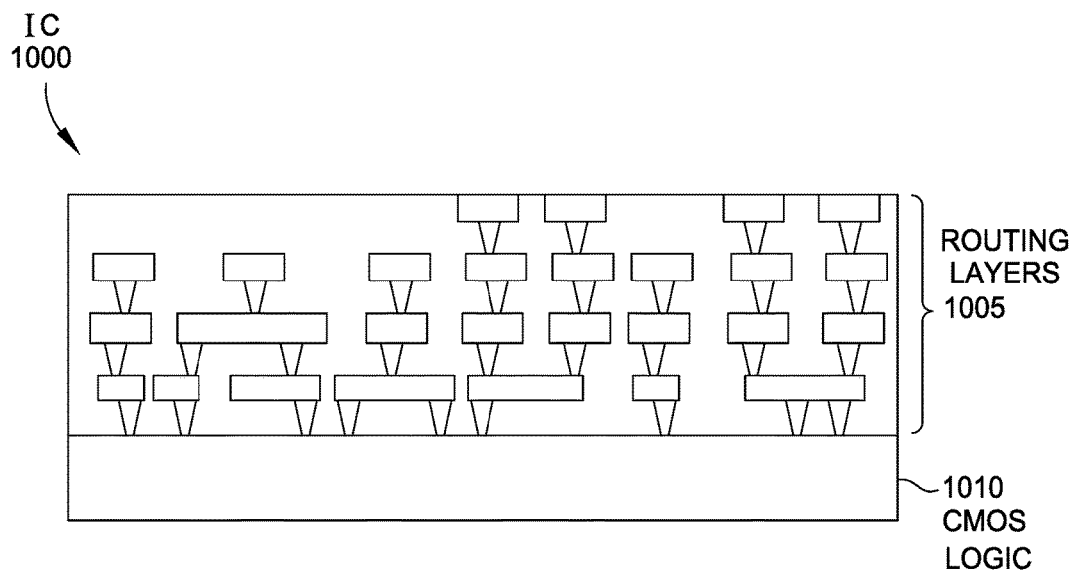
FIGS. 10A-10D illustrate evanescently coupling a photonic chip to an external optical device, according to embodiments described herein.

FIGS. 10A-10D illustrate evanescently coupling a photonic chip to an external optical device, according to embodiments described herein. FIG. 10A illustrates an IC 1000 that includes routing layers 1005 communicatively coupled to CMOS logic 1010. Generally, the routing layers 1005 permit different elements in the CMOS logic 1010 to communicate and share data. Moreover, as described in more detail below, the routing layers 1005 permit drivers in the CMOS logic 1010 to control optical components in a photonic chip.

Figure 10B:
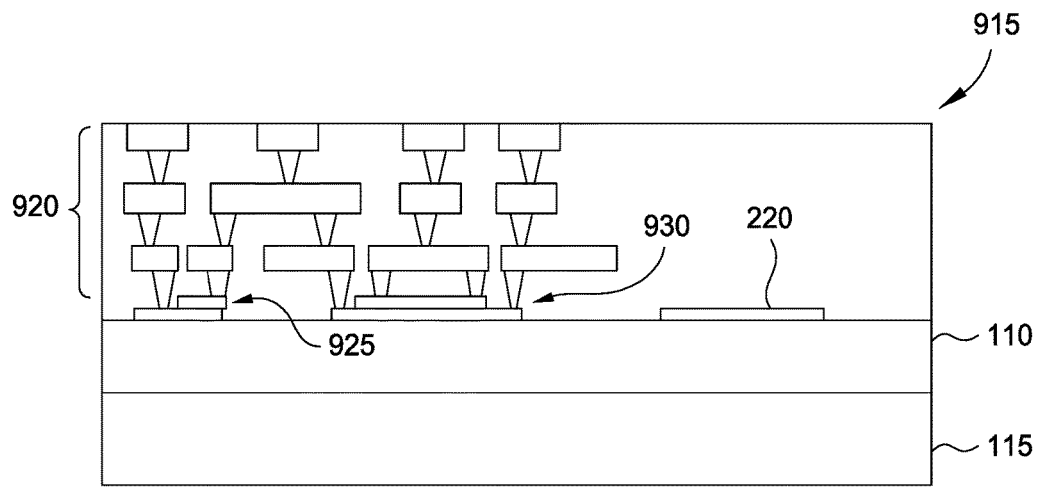

FIG. 10B illustrates a photonic chip 915 that is the same as the chip 915 shown in FIG. 9B, and thus, will not be described in detail here.

Figure 10C:
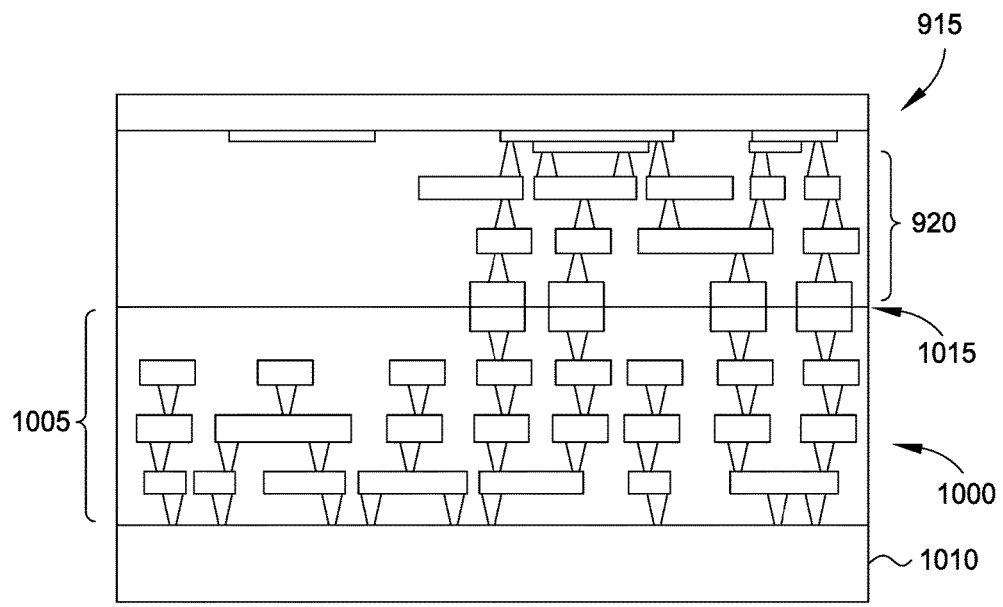

FIG. 10C illustrates flipping over the photonic chip 915 such that the exposed surface of the routing layers 920 is coupled to the exposed surface of the routing layers 1005 in the IC 1000 at a coupling interface 1015. In one embodiment, at least the exposed surfaces in the routing layers 920 and 1005 are copper that permit a copper-copper bond between the photonic chip 915 and the IC 1000. Moreover, if the routing layers 920 in the chip 915 and the routing layers 1005 in the IC 1000 are surrounded by oxide materials, the chip 915 and IC 1000 can be further bonded at the coupling interface 1015 using an oxide-oxide bond. Thus, a hybrid copper-oxide bond can be used to flip-chip bond the photonic chip 915 to the IC 1000.

Once bonded, the semiconductor substrate 115 of the photonic chip 915 can be removed using a grinding or CMP process. However, unlike in the method shown in FIGS. 9A-9F, here, the substrate bonded to the photonic chip 915 (i.e., IC 1000) provides more than just support to the photonic chip 915. In one example, the CMOS logic 1010 can be used to control the optical components in the photonic chip 915.

Figure 10D:
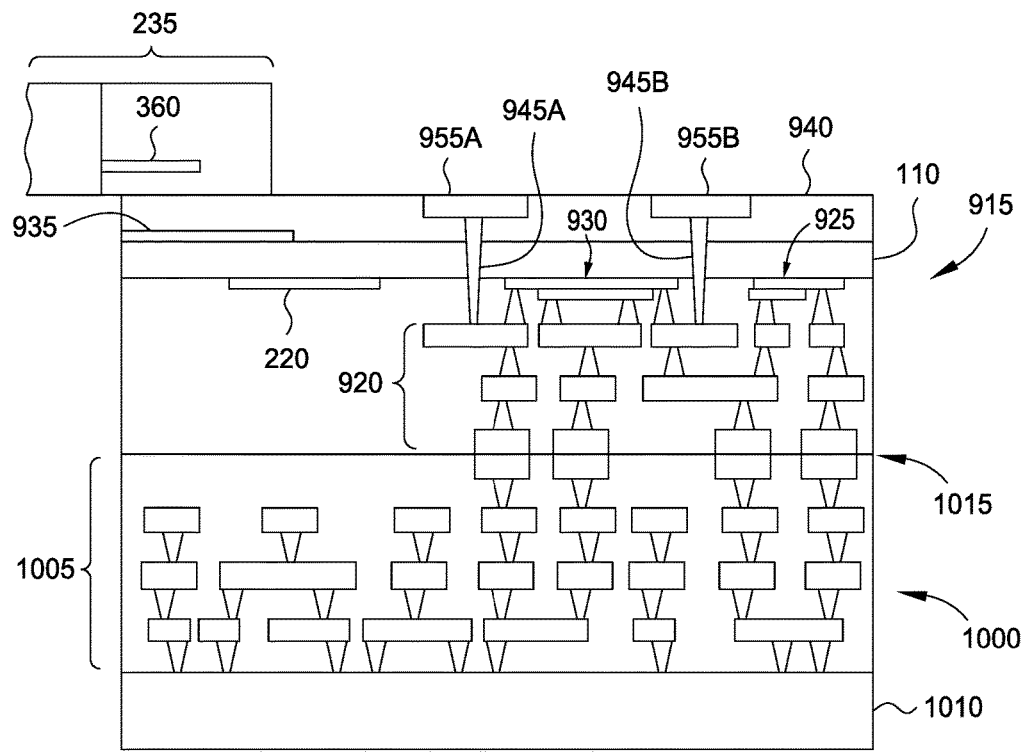

FIG. 10D illustrates disposing the evanescent coupler 935 and the oxide material 940 on the insulation layer 110 in the photonic chip 915. Moreover, the external device 235 is disposed on the oxide material 940 in order to optically couple the waveguide 360 to the silicon waveguide 220. Like above, the coupler 935 is evanescently coupled to the both the waveguide 360 and the silicon waveguide 220 using, for example, inverse tapering ends. Moreover, the distances between the waveguide 360, the evanescent coupler 935, and the waveguide 220 are controlled to achieve evanescent coupling.

FIG. 10D also illustrates TOVs 945 which couple the bond pads 955 to the routing layers 920. Moreover, because the routing layers 920 are electrically connected to the routing layers 1005 in IC 1000, the bond pads 955 provide a communication interface for passing data to and/or receiving data from the CMOS logic 1010. For example, the bond pads 955 may be coupled to a printed circuit board which transmits instructions to the CMOS logic 1010 for controlling the optical components 925 and 930 in the photonic chip 915. Thus, FIGS. 10A-10D illustrate flip chip bonding a photonic chip 915 to an IC 1000 and evanescently coupling the combined device to the external optical device 235 for transmitting optical signals into, and out of, the silicon waveguide 220 in the photonic chip 915.

Figure 11A:
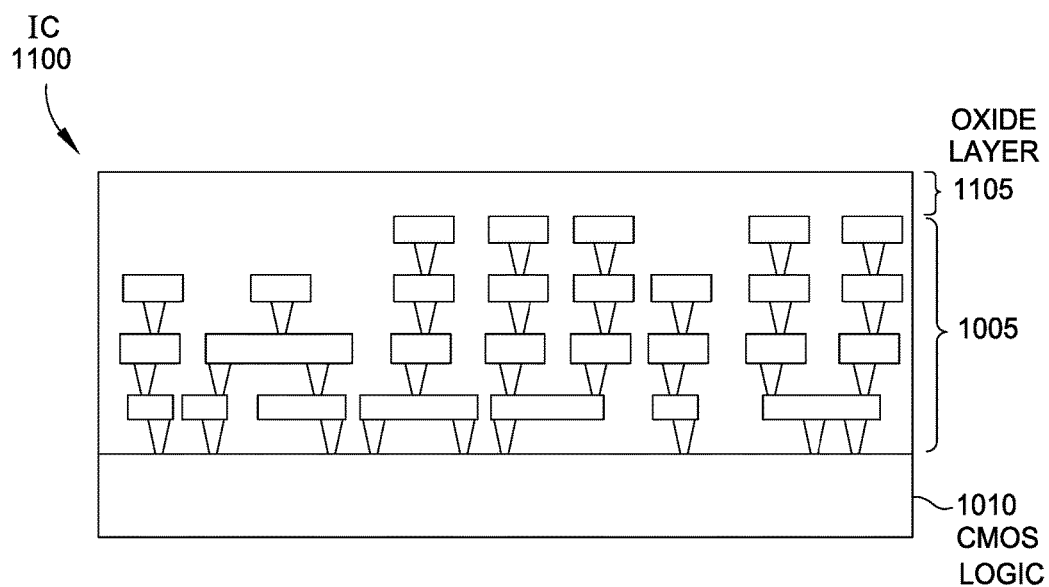
FIGS. 11A-11D illustrate evanescently coupling a photonic chip to an external optical device, according to embodiments described herein.

FIGS. 11A-11D illustrate evanescently coupling a photonic chip to an external optical device, according to embodiments described herein. FIG. 11A illustrates an IC 1100 that is the same as IC 1000 in FIG. 10A except for an oxide layer 1105 disposed over the routing layers 1005.

Figure 11B:
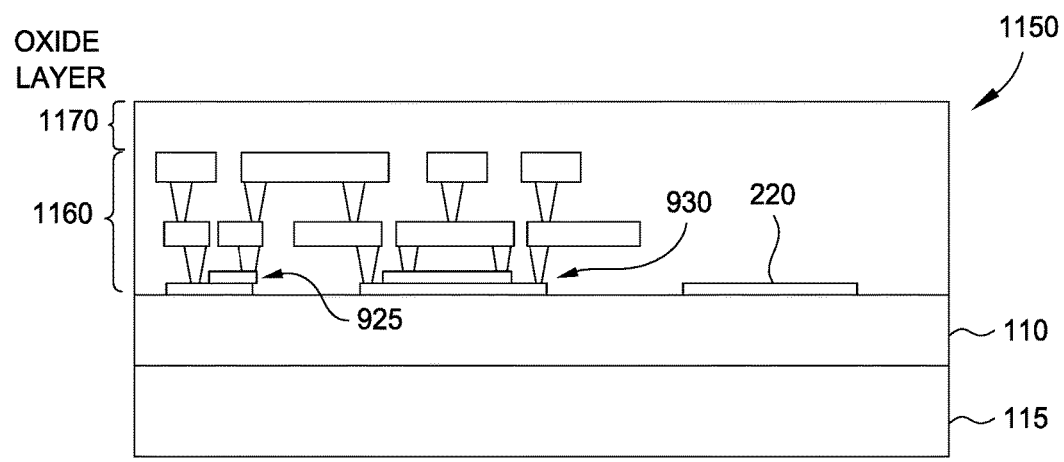

FIG. 11B illustrates a photonic chip 1150 where, like the IC 1100, an oxide layer 1170 is disposed over routing layers 1160. Stated differently, the routing layers 1160 are not exposed on the photonic chip 1150 but rather are covered by the thin oxide layer 1170 (e.g., less than 10 microns).

Figure 11C:
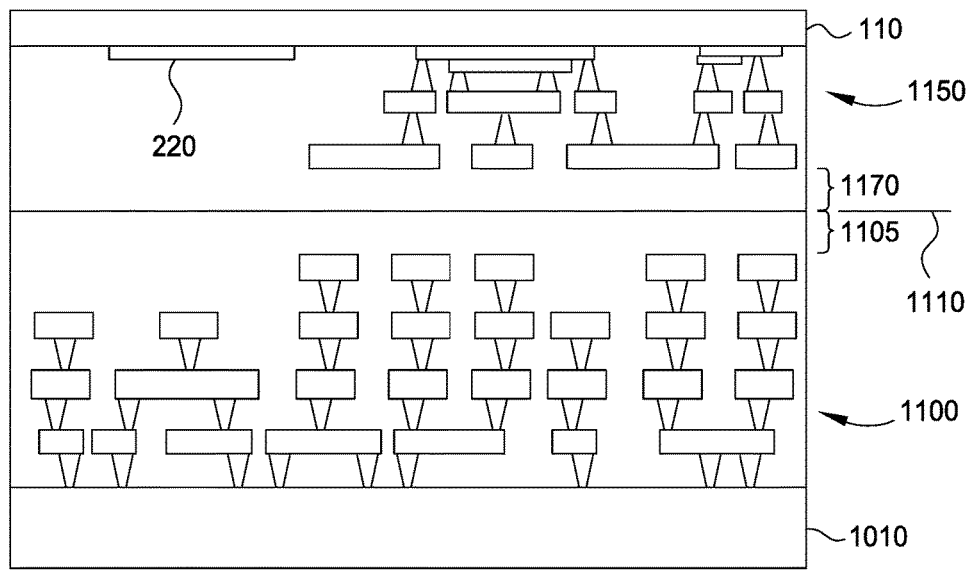

FIG. 11C illustrates flip-chip bonding the IC 1100 to the photonic chip 1150. Because of the oxide layers 1105 and 1170, the metal in the routing layers 1005 and 1160 do not directly contact. As such, the coupling interface 1110 is primarily an oxide-oxide bond between the oxide layers 1170 and 1105. Thus, the method shown in FIG. 11A-C avoids having a metal-to-metal bond (e.g., copper-copper) like in FIG. 10C at the coupling interface 1015. Moreover, once the oxide-oxide bond is formed, the semiconductor substrate 115 can be removed from the photonic chip 1150.

Figure 11D:
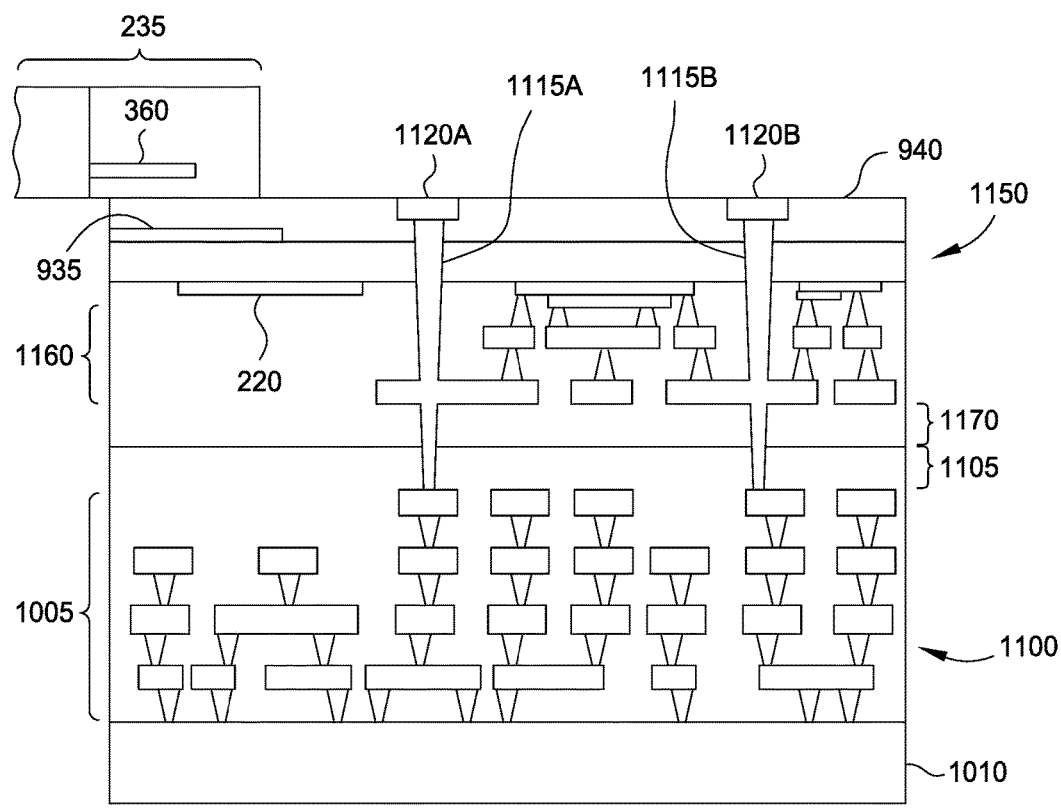

FIG. 11D illustrates disposing an evanescent coupler 935 and oxide material 940 on the insulation layer 110 in the photonic chip 1150. Moreover, the external device 235 is disposed on the oxide material 940 in order to optically couple the waveguide 360 to the silicon waveguide 220. Like above, the coupler 935 is evanescently coupled to the both waveguide 360 and the silicon waveguide 220 using, for example, inverse tapering ends. Moreover, the distances between the waveguide 360, the evanescent coupler 935, and the waveguide 220 are controlled to achieve evanescent coupling.

FIG. 11D also illustrates TOVs 1115 which couple bond pads 1120 to the routing layers 1160. In addition, the TOVs 1115 extend through the oxide layer 1170 in the photonic chip 1150 and the oxide layer 1105 in the IC 1100. As such, the TOVs 1115 provide an electrical path between the routing layers 1160 in the photonic chip 915 and the routing layers 1005 in the IC 1100 when there was no electrical path previously. Because the TOVs 1115 electrically connect the routing layers 1160 to the routing layers 1005, the bond pads 1120 provide a communication interface for passing data to and/or receiving data from the CMOS logic 1010. Like above, the bond pads 1120 may be coupled to a printed circuit board which provides instructions to the CMOS logic 1010 for controlling the optical components in the photonic chip 1150. Thus, FIGS. 11A-11D illustrate flip chip bonding a photonic chip 1150 to an IC 1100 and evanescently coupling the resulting combined device to the external optical device 235 for transmitting optical signals into, and out of, the silicon waveguide 220 in the photonic chip 1150.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The manufacturing flows and block diagrams in the Figures illustrate the architecture, functionality and operation of possible implementations of systems or methods. It should also be noted that, in some alternative implementations, the processes illustrated in the flows may occur out of the order noted in the figures. For example, two processes shown in succession may, in fact, be executed substantially concurrently, or the blocks may sometimes be executed in the reverse order, depending upon the functionality involved.

In view of the foregoing, the scope of the present disclosure is determined by the claims that follow.

We claim:

1. An optical system, comprising:
    a photonic chip, comprising:
        a silicon waveguide,
        an active surface layer comprising a first optical component optically coupled to the silicon waveguide, and
        an evanescent coupler spaced apart from the silicon waveguide along a direction normal to the active surface layer, wherein the evanescent coupler is optically coupled to the silicon waveguide; and
    an external optical device, comprising:
        a second optical component,
        a spot size converter coupled to the second optical component and overlapping the evanescent coupler, wherein the spot size converter is configured to alter a mode size of optical signals transferred between the evanescent coupler and the spot size converter, and
    wherein the photonic chip and the external optical device are bonded together along a coupling interface that is parallel to the active surface layer.

2. The optical system of claim 1, wherein the photonic chip further comprises:
    an optical via disposed between the evanescent coupler and the silicon waveguide, wherein the optical via includes a plurality of waveguides disposed at different layers spaced apart along the direction normal to the active surface layer, and wherein portions of the plurality of waveguides are tapered to transfer optical signals between the evanescent coupler and the silicon waveguide.

3. The optical system of claim 2, wherein the photonic chip further comprises:
    a plurality of metal and via routing layers coupled to the first optical component, wherein the plurality of waveguides of the optical via are disposed on at least some of the plurality of metal and via routing layers.

4. The optical system of claim 1, wherein the evanescent coupler is disposed on a first side of an insulation layer that is opposite a second side of the insulation layer that contacts the active surface layer, wherein a second end of the evanescent coupler overlaps a first end of the silicon waveguide along the direction normal to the insulation layer and the active surface layer, and
    wherein the second end of the evanescent coupler is inversely tapered relative to the first end of the silicon waveguide such that the evanescent coupler and the silicon waveguide are evanescently coupled.

5. The optical system of claim 4, wherein the coupling interface and the external optical device are disposed on a first side of the active surface layer, wherein the photonic chip further comprises:
    a through oxide via extending from the coupling interface, through the insulation layer, and through the active surface layer to connect to at least one metal layer coupled to the first optical component.

6. The optical system of claim 1, further comprising:
    a coupling waveguide in the spot size converter, wherein a width of a first end of the coupling waveguide decreases as the coupling waveguide extends along a first direction and a width of a first end of the evanescent coupler increases as the evanescent coupler extends along the first direction, thereby creating an inverse taper.

7. The optical system of claim 6, wherein a gap between the first ends of the coupling waveguide and the evanescent coupler along the direction normal to the active surface layer is less than or equal to 500 nanometers.

8. The optical system of claim 1, wherein the external optical device is bonded to the photonic chip at the coupling interface using at least one of an oxide-oxide bond, a solder collapse bond, and an epoxy collapse bond.

9. The optical system of claim 1, wherein the second optical component is a light source configured to transmit light into the silicon waveguide through the spot size converter and evanescent coupler.

10. A photonic chip, comprising:
an active surface layer comprising a first optical component optically coupled to a silicon waveguide;
an evanescent coupler spaced apart from the silicon waveguide along a direction normal to the active surface layer, wherein the evanescent coupler is optically coupled to the silicon waveguide;
an optical via disposed between the evanescent coupler and the silicon waveguide, wherein the optical via includes a plurality of waveguides disposed at different layers spaced apart along the direction normal to the active surface layer, and wherein portions of the plurality of waveguides are tapered to transfer optical signals between the evanescent coupler and the silicon waveguide; and
a coupling interface parallel to the active surface layer, wherein the evanescent coupler is arranged proximate to the coupling interface to permit the evanescent coupler to optically couple to an external optical device when the external optical device is bonded to the coupling interface.

11. The photonic chip of claim 10, further comprising:
a plurality of metal and via routing layers coupled to the first optical component, wherein the plurality of waveguides of the optical via are disposed on at least some of the plurality of metal and via routing layers.

12. The photonic chip of claim 10, further comprising:
a coupling waveguide, wherein a width of a first end of the silicon waveguide decreases as the silicon waveguide extends along a first direction and a width of a first end of the evanescent coupler increases as the evanescent coupler extends along the first direction thereby creating an inverse taper.

13. A method, comprising:
providing a photonic chip comprising an insulation layer, an active surface layer contacting the insulation layer, and a plurality of metal routing layers electrically coupled to a first optical component in the active surface layer, and wherein the first optical component is optically coupled to a silicon waveguide;
bonding an oxide layer in a wafer to the photonic chip; and
disposing an evanescent coupler on the insulation layer, wherein the evanescent coupler is optically coupled to the silicon waveguide in the active surface layer.

14. The method of claim 13, further comprising:
disposing an insulative material over the evanescent coupler; and
mounting an external optical device on the insulative material, the external optical device comprising a spot size converter evanescently coupled to the evanescent coupler and a second optical component coupled to the spot size converter, wherein the spot size converter is configured to alter a mode size of optical signals transferred between the silicon waveguide and the second optical component.

15. The method of claim 13, wherein the wafer comprises CMOS logic disposed in a semiconductor substrate and a plurality of metal routing layers in the oxide layer, wherein the plurality of metal routing layers are electrically coupled to the CMOS logic.

16. The method of claim 15, further comprising:
forming a through oxide via extending through the insulation layer, through the active surface layer, and coupling to one of the plurality of metal routing layers.

17. The method of claim 16, wherein the through oxide via extends through a first side of the oxide layer and electrically connects to one of the plurality of metal routing layers in the wafer.

18. A photonic chip, comprising:
an active surface layer comprising a first optical component optically coupled to a silicon waveguide;
an evanescent coupler spaced apart from the silicon waveguide along a direction normal to the active surface layer, wherein the evanescent coupler is optically coupled to the silicon waveguide, and
wherein the evanescent coupler is disposed on a first side of an insulation layer that is opposite a second side of the insulation layer that contacts the active surface layer, wherein a second end of the evanescent coupler overlaps a first end of the silicon waveguide along the direction normal to the insulation layer and the active surface layer, and
wherein the second end of the evanescent coupler is inversely tapered relative to the first end of the silicon waveguide such that the evanescent coupler and the silicon waveguide are evanescently coupled; and
a coupling interface parallel to the active surface layer, wherein the evanescent coupler is arranged proximate to the coupling interface to permit the evanescent coupler to optically couple to an external optical device when the external optical device is bonded to the coupling interface.

19. The photonic chip of claim 18, wherein the coupling interface is disposed on the first side of the insulation layer, wherein the photonic chip further comprises:
a through oxide via extending from the coupling interface, through the insulation layer, and through the active surface layer to connect to at least one metal layer coupled to the first optical component.

* * * * *

UNITED STATES PATENT AND TRADEMARK OFFICE
CERTIFICATE OF CORRECTION

PATENT NO.        : 10,481,326 B2
APPLICATION NO.   : 15/899255
DATED             : November 19, 2019
INVENTOR(S)       : Vipulkumar Patel et al.

Page 1 of 1

It is certified that error appears in the above-identified patent and that said Letters Patent is hereby corrected as shown below:

In the Drawings

On sheet 2 of 14, in Fig. 3, reference numeral 235, Line 2, delete "COVERTER" and insert -- CONVERTER --, therefor.

In the Specification

In Column 5, Line 11, delete "geranium" and insert -- germanium --, therefor.

In Column 8, Line 45, delete "4156" and insert -- 415B --, therefor.

In Column 13, Line 30, delete "FIG." and insert -- FIGS. --, therefor.

In Column 14, Line 65, delete "FIG." and insert -- FIGS. --, therefor.

Signed and Sealed this
Twenty-eighth Day of January, 2020

Andrei Iancu
*Director of the United States Patent and Trademark Office*